United States Patent [19]

de Loye et al.

[11] 3,956,578

[45] May 11, 1976

[54] FACSIMILE SYSTEM FOR THE TRANSMISSION OF PICTURE

[75] Inventors: Martin de Loye, Paris; Didier Léonard, Boulogne-sur-Seine; Claude Cardot, Gig-sur-Yvette, all of France

[73] Assignee: Compagnie Industrielle des Telecommunications Cit-Alcatel, Paris, France

[22] Filed: Dec. 27, 1974

[21] Appl. No.: 536,892

[30] Foreign Application Priority Data

Jan. 4, 1974    France .............................. 74.00270

[52] U.S. Cl. .............................. 178/6; 178/DIG. 3
[51] Int. Cl.² .......................................... H04N 1/38
[58] Field of Search ........................... 178/DIG. 3, 6; 179/15.55 G

[56] References Cited
UNITED STATES PATENTS

| | | | |
|---|---|---|---|
| 2,905,756 | 9/1959 | Graham | 178/DIG. 3 |
| 2,921,124 | 1/1960 | Graham | 178/DIG. 3 |
| 3,051,778 | 8/1962 | Graham | 178/DIG. 3 |
| 3,801,737 | 4/1974 | Komura | 178/DIG. 3 |
| 3,849,592 | 11/1974 | Rosenheck | 178/DIG. 3 |

*Primary Examiner*—Howard W. Britton
*Assistant Examiner*—Michael A. Masinick
*Attorney, Agent, or Firm*—Haseltine, Lake & Waters

[57] ABSTRACT

This system is provided for the field of electronic facsimile transmitting of a picture and relates more particularly to the compression of data to reduce the number of bits to be transmitted at a given resolution of the picture. Compression is effected by a correlation of neighbouring points of the picture by omitting, at the transmitting end, one point in four on two adjacent lines and by restituting it at the receiving end by means of a relatively simple Boolean function which takes into account the structure of the characters used in that picture. That first compression may be combined with a second compression due to the coding of the length of a white range.

4 Claims, 3 Drawing Figures

FACSIMILE SYSTEM FOR THE TRANSMISSION OF PICTURE

The invention relates to the field of electronic facsimile transmitting of a picture constituted by black or white points arranged in rows and columns and relates more particularly to the reducing of the transmitting time by a reduction in the redundancy of a document.

It has already been proposed to reduce the number of bits for the binary transmission of a facsimile by making use of the fact that the completely white zones are very frequent because of the spaces between words and between lines. In that case, the repeated transmitting of the "white" data is replaced by a code which summarizes the size of the white space between two black points. At the receiving end, a decoder restores a sequence of white data as a function of the code received. It should be mentioned that no essential data is lost when that compression is made and that the original data is completely restored, except for errors in the transmission channel.

It is an object of the invention to provide an even more extensive reduction in the number of bits to be transmitted without losing any essential data.

The facsimile transmission system for a picture constituted by black or white points arranged in rows and columns comprises, at the transmission end, a compressor and a buffer memory and, at the receiving end, a decompressor and another buffer memory and it is characterized, according to the invention, in that the compressor processes, simultaneously, four bits corresponding to four points which belong to two neighbouring rows and two neighbouring columns of the picture and in that it sends out a triplet corresponding to three of these four points, the decompressor being equipped to restore the fourth bit as a function of at least two triplets received successively.

The basic idea is therefore to make use of the correlation between neighbouring points of the picture, that correlation being particularly noticeable in printed characters. For Latin characters, for example, a preponderance of horizontal and vertical lines in relation to transversal lines is observed. The traces written on a document also obey certain correlation rules. The system according to the invention makes it possible to keep available for the user, on the receiving side, a certain number of different functions which may be used alternately according to the nature of the document transmitted, so that in each case, the best adapted may be chosen.

This compression which reduces one bit in four on the transmission line may be combined with the known system cited above, which may be called "coding of the pure white spaces."

The invention will be described hereinafter with reference to the accompanying drawing in which.

The picture which is to be transmitted is constituted by black or white points arranged in rows and columns. In the conventional case, the picture is decomposed into successive points in a row, thus providing for processing successively the different rows. In the system according to the invention, a block composed of four points belonging to two neighbouring rows and two neighbouring columns are processed simultaneously. After the processing of a block, the neighbouring block is processed and so on until the two rows or the two columns in question, according to the direction of advance chosen, are completely processed. At the transmission end, the function of the compressor consists simply of omitting a point of the block.

Figure 1:
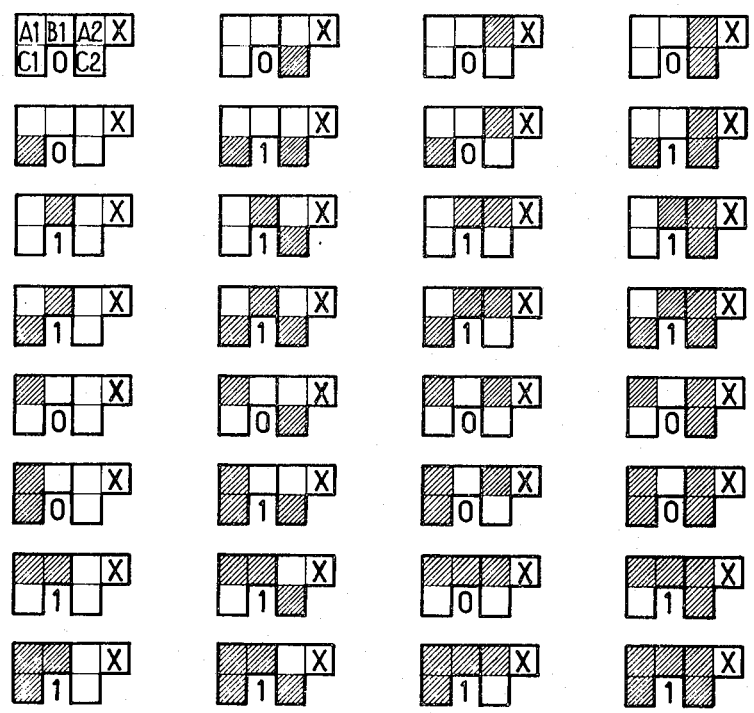
FIG. 1 shows graphically the operation of the system.

In the example in FIG. 1, the one which is on the bottom right-hand side is omitted. At the receiving end, the missing points are reconstituted in a decompressor, taking into account the distribution of the blacks and whites (or of the 1's and 0's) in the three bits constituting the triplet which describes the block in question, as well as in the following triplet.

FIG. 1 shows thirty-two variants of the black-white distribution in two neighbouring blocks such as they are liable to be applied to the receiving end, that is, without the fourth bit. A shaded square indicates a black point; a non-shaded square indicates a white point and a cross indicates that this point is optimal inasmuch as concerns the restoring of the bit in question; it may therefore be black or white. The best rule for restoring the fourth bit for a given document may easily be found by means of a calculator. In the example chosen in FIG. 1, the preference of certain printed characters is taken into account for the horizontal and vertical rows. Calling the points of the first row in each block A and B and the points in the second row C, D and using the index 1 for the block whose fourth bit is restored and the index 2 for the following block, the Boolean function may be written as follows:

$$D1 = B1 \; (\overline{A1} \lor \overline{A2} \lor C1 \lor C2) \lor C1.C2. \; (\overline{A1} \lor \overline{A2}).$$

It is evident that this formula may easily be modified if the characteristic of the traces on the document requires it.

The following example will show clearly the operation of the compressor-decompressor. It is required to transmit a document in which two rows of quantified points show the following structure:

00 01 11 10 01 11 00 00 00 01 01 11 00 00 00 00 00
00 00 00 00 10 00 01 00 10 01 11 00 00 00 01 01
01 00 01 00 00 00 00 00 00 00 10

Omitting in each block of four points the bit which is in the second row on the right-hand side, the following sequence of triplets is obtained:

000 010 110 101 010 111 000 000 000 010 010 110
000 000 000 000 000 000 000 000 000 101

At the receiving end, these triplets are completed again by means of the Boolean function cited above or of the table according to FIG. 1, this giving the following sequence of blocks:

00 01 11 10 01 11 00 00 00 01 01 11 00 00 00 00 00
00 00 00 00 10 00 01 01 10 01 11 00 00 00 01 01
01 00 00 00 00 00 00 00 00 00 10

Comparing this sequence with the original sequence, two slight modifications due to the inexact correlation are observed, this seeming quite bearable with a view to the reduction in the number of bits transmitted. This reduction is 25%.

As has been stated above, it is possible to obtain another compression by a coding of the purely white spaces which are more or less frequent between words and between lines. Three such spaces exist in the example chosen above.

The simplest coding is counting the completely white triplets and having the number of triplets preceded by a triplet 000. A single white triplet would therefore be coded by two triplets 000, two white triplets by 000 001 and so on up to seven white triplets which would be coded from as 000 110; one more white triplet would give 000 111 000 and the counting would continue for a greater number of white triplets in that last triplet.

According to that rule, the sequence of triplets effectively emitted may be established as follows:

000 000 010 110 101 010 111 000 010 010 010 110 000 111 001 101

It is obvious that this coding has no incidence on the restoring of the facsimile if the decoding is effected properly.

Figure 2:
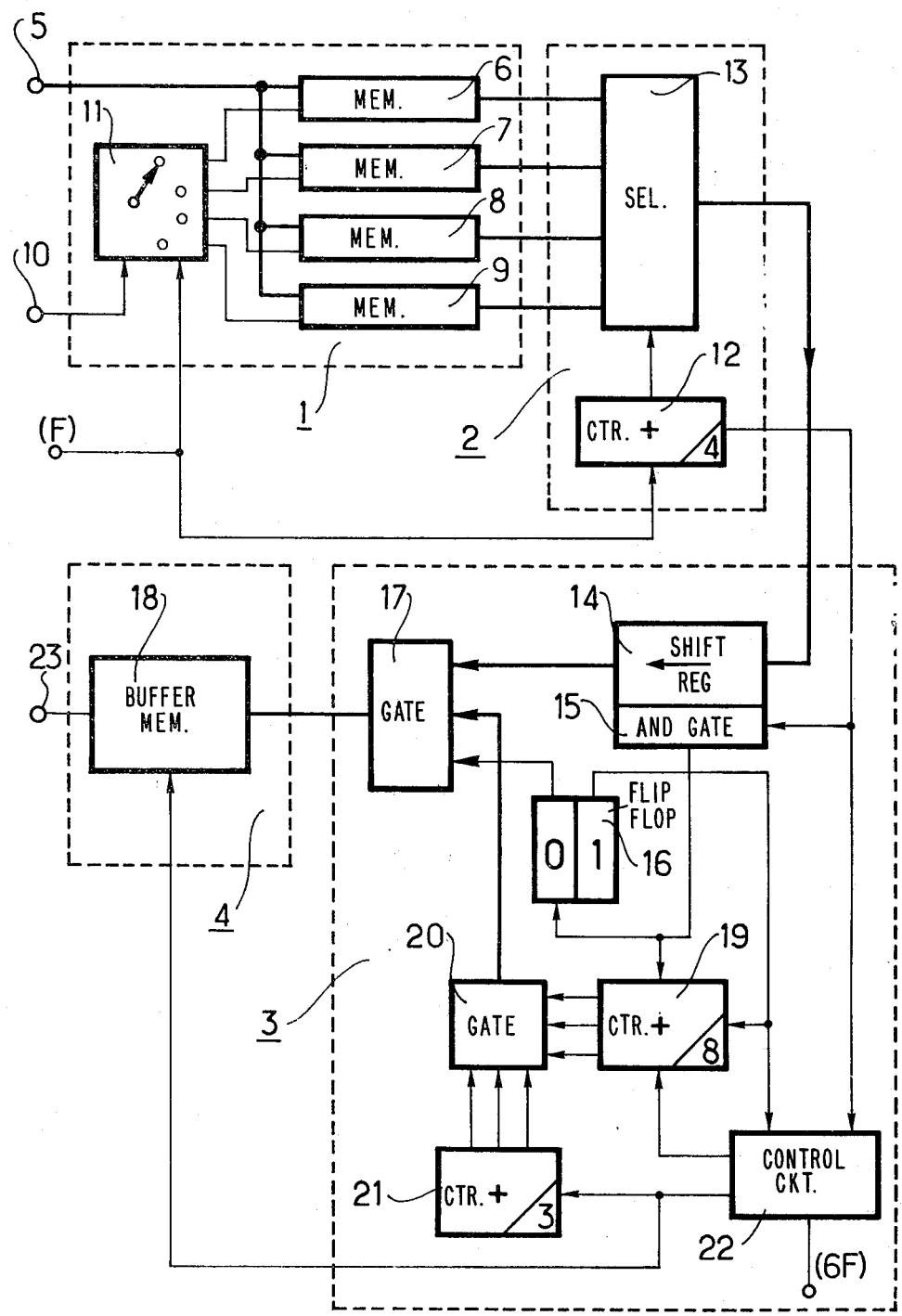
FIG. 2 shows diagrammatically the circuit of the compressor-coder.

Referring to FIG. 2, which shows the compressor-coder according to the invention, four parts may be distinguished: a first part 1 which transforms the reading row by row into reading two rows by two rows; a compressor 2 which omits one point in four per group of four points, two of which belong to the first row and two of which belong to the second row; a coder 3 which effects the coding of the length of white zones the compression of which has provided the triplet 000; a fourth part 4 constituted by a buffer memory which is charged at a variable speed and read at a fixed speed for transmitting the data in a line at the maximum permissible speed by the support of the connection.

The binary signal comes in series to an input 5 point by point and row by row of the picture to be transmitted. The first part 1 comprises four memories 6 to 9 each having a capacity of one complete row. By means of a synchronization pulse arriving at each start of a row on an input 10, a distributor circuit 11 is synchronized, which, itself, controls the cyclic feeding of the four memories by the data contained in four successive rows of the picture. That feeding is effected at the rhythm of a clock at the frequency F.

While one of the first two memories 6 or 7 is being fed, the processing of the data contained in the other two memories 8 and 9 is effected in the part 2 and vice versa. That processing consists mainly in eliminating the fourth bit per block of four points, this making it possible to form a triplet of three bits. It should be stated that the choice of that fourth bit in the topology is free, on condition that the same be chosen always. The part 2 comprises a counter 12 having a capacity of four which operates at the frequency F and which affects a selector 13, to form triplets either from the data coming from the memories 6 and 7, or from the data contained in the memories 8 and 9. The fourth state of the counter 12 corresponding to the duration of the omitted point is used as a processing cycle for coding the zones, which will be described hereinafter.

The output of the selector 13 operates, in the third part 3, a shift register 14, that register being related to an AND gate 15 which makes it possible to recognize a triplet 000. The output of that gate is connected to the input of a flip-flop 16 which is set in the state 0 only when a triplet 000 has been recognized. In the state 1, that flip-flop admits the transmission of the triplets of the shift register 14 by a gate 17 towards a buffer memory 18 belonging to the fourth part 4.

If, on the other hand, a triplet 000 is recognized in the state 4 of the counter 12, that triplet is sent at the high frequency of 6 F towards the buffer memory 18 before making the flip-flop change over to zero. The input of the memory 18 is then inhibited by the gate 17 during the arrival of the following triplets 000 which are counted by a three-bit counter 19. When that counter reaches the state 111, the triplet 111 is sent into the buffer memory 18. As soon as a first triplet different from 000 appears, the contents of the counter 19 is sent into the buffer memory 18 during the state 4 of the counter 12. Then the flip-flop 16 is reset to 1. The reading of the counter 19 is obtained by a system of control gates 20 connected to another counter 21 counting in threes, which makes it possible to transmit in series the three bits of the counter 19 by the gate 17 in the buffer memory. The operation at high frequency is controlled by a control circuit 22 in the state 4 of the counter 12 when the flip-flop 16 is in the state 0.

That circuit affects, moreover, the writing mechanism of the buffer memory to transmit the corresponding coded triplets to the output of the counter 19. The contents of the buffer memory 18 is read at the transmission frequency by an output 23.

Figure 3:
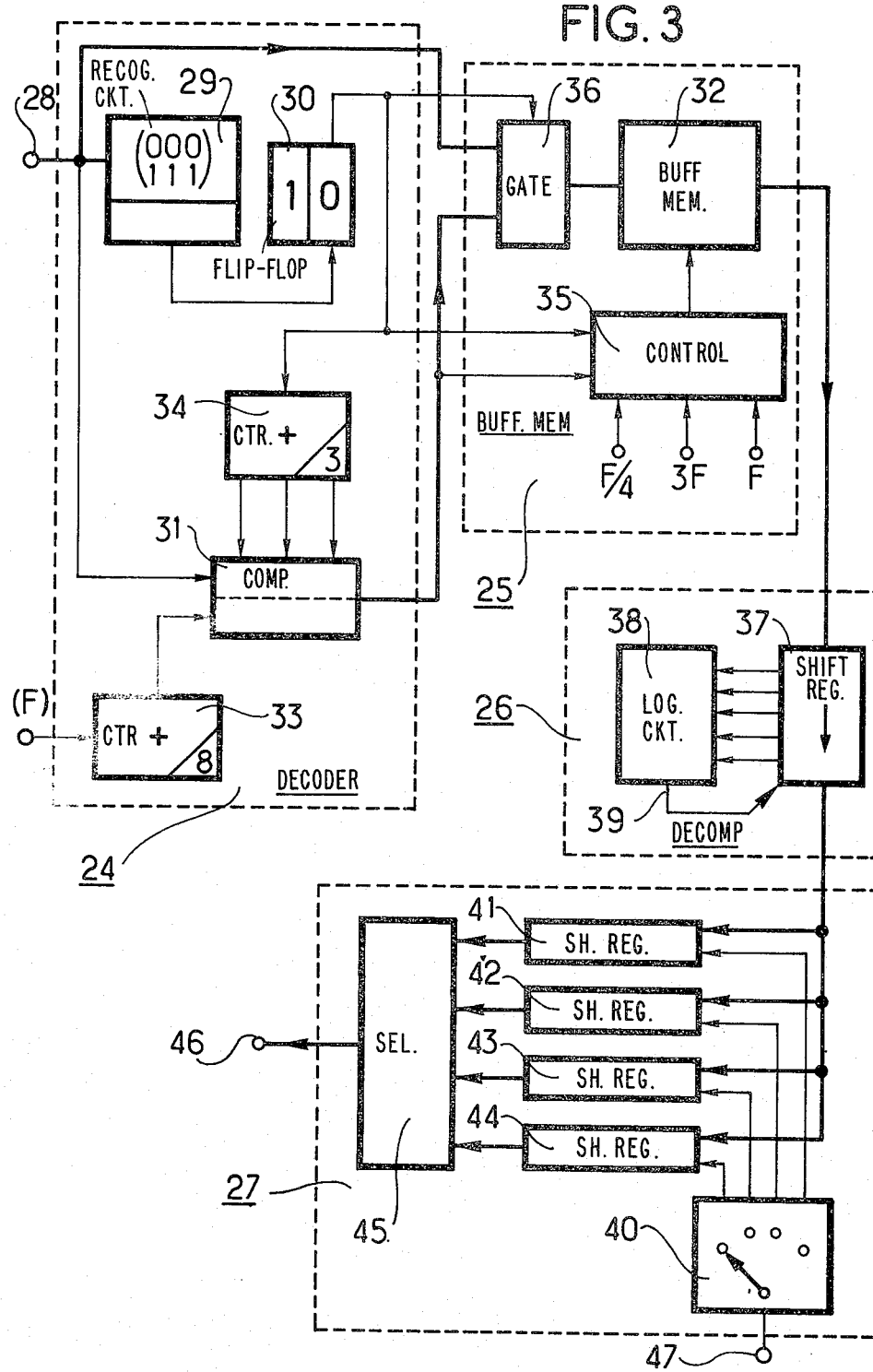
FIG. 3 is a block diagram of the decoder-decompressor.

The decompressor-decoder which is shown in FIG. 3 also comprises four parts: a decoder 24 enables the decoding of the data describing white spaces; a second part 25 comprises mainly a buffer memory which enables the regularizing of the flow of data to change over from the flow of data in the rows to the flow of data at writing speed; a decompressor 26 restores the fourth bit belonging to a block of four points; a fourth part 27, finally, fulfills the opposite function to that of the first part according to FIG. 2, this making it possible to change over again from the transfer two rows by two rows to the row by row transfer.

The incident signal already sampled and quantified reaches an input 28. In the decoder 24, it feeds a recognition circuit 29 for the triplets 000 and 111. This circuit controls a state flip-flop 30 which therefore indicates whether the incident triplet is a code defining the white spaces or not. The input 28 is, moreover, connected to a comparator 31 which sends out to a buffer memory 32, contained in the second part 25, the number of bits 0 originally transmitted. To do this, it is related to a counter 33 counting in eights, operating at the frequency F and to a counter 34 counting in threes, operating at the row transmission frequency, which may be F/4. This latter counter is used for synchronizing the comparator with the start of a triplet. When the state flip-flip 30 is at 0, the comparator compares the incident triplet with the contents of the counter 33 and sends out bits 0 to the buffer memory until the triplet received is identical with the contents of the counter 33. This writing of 0 in the buffer memory is effected at the frequency 3 F. For that purpose, the memory is related to a control circuit 35 which effects the reading at a frequency of F/4, F or 3 F according to the state of the flip-flop 30 and of the comparator 31. At the same time, a gate 36 at the input of the memory 32 switches either the output of the comparator or the input 28 of the decoder onto the memory.

The flip-flop 30 changes back to 1 after any recognition of a triplet 000, except if the following triplet is 111.

The output of the buffer memory 32 operates the decompressor 26 according to the invention which restores the fourth point of a block by means of five adjacent points as shown in the examples according to FIG. 1. For that purpose, the decompressor comprises a shift register 37 making it possible to memorize two successive triplets. A combinative logic circuit 38 is fed by the outputs of the register 37 and sends out at its output 39 the boolean function cited above which restores the fourth point. That bit has then entered that same shift register 37 between the last bit of the present triplet and the first bit of the following triplet.

The fourth part 27 comprises a distributor 40, four shift registers 41 to 44 and a final selector 45 which restores, at an output 46 the sequence of the bits row by row on the order of a "Row Start Pulse" which it receives on an input 47. That part is therefore equivalent to the first part 1 according to FIG. 2.

The invention is not limited to the example described hereinabove. More particularly, the principle of the correlation of the neighbouring points may be applied independently from the coding of the pure white spaces. It is possible, moreover, to choose another boolean function than that described hereinabove in relation with the characters on the document a facsimile of which is required to be transmitted. Lastly, it is possible to make available to the user, at the receiving end, a certain number of different boolean functions which may be selected automatically or manually. In that case, the different functions are registered in a memory according to the electronic computer technique.

We claim:

1. A facsimile transmission system for a picture constituted by black or white points arranged in rows and columns comprising at the transmission end, a compressor and a buffer memory and, at the receiving end, a decompressor and another buffer memory, the compressor (2) processing, simultaneously, four incident bits corresponding to four points which belong to two neighbouring rows and two neighbouring columns of the picture and in that it sends out a triplet corresponding to three of these four points, the decompressor (26) being adapted to restore the fourth bit as a function of at least two triplets received successively.

2. A transmission system according to claim 1, characterized in that the compressor (2) is followed by a "pure white" coder (3) comprising a recognition device (14 and 15) for a triplet signifying "pure white" and a counter (19) which counts these triplets and which sends out instead of these triplets, a code signifying the number of successive pure white triplets, the decompressor (26) being preceded by a "pure white" decoder (24) which is fitted up to reconstitute the "pure white" triplets by means of that code.

3. A system according to claim 1, wherein the said function which restores the fourth bit is generated in a combinative logic element (38) whose parameters are stored in a memory.

4. A facsimile transmission system for a picture, constituted by black points and white points, arranged in rows and columns, comprising a transmission device, a transmission line and a receiving device, in which the transmission device comprises a compressor having four binary inputs, receiving, simultaneously, four incident bits corresponding to four points, which belong to two neighbouring rows and two neighbouring columns of the picture, that compressor sending out, at the output, a triplet corresponding to three of these four points and in which the receiving device comprises a decompressor with a shift register and a combinative logic circuit, that register receiving two successive triplets and the combinative logic circuit receiving the parallel outputs of the shift register and sending out to the latter a binary data item, restoring the fourth point which apertains to one of the two triplets contained in the register.

* * * * *